United States Patent [19]
Karp et al.
[11] 3,855,483
[45] Dec. 17, 1974

[54] MEMORY SYSTEM INCORPORATING A MEMORY CELL AND TIMING MEANS ON A SINGLE SEMICONDUCTOR SUBSTRATE

[75] Inventors: Joel A. Karp; William M. Regitz, both of Cupertino, Calif.
[73] Assignee: Intel Corporation, Santa Clara, Calif.

[22] Filed: Mar. 15, 1973
[21] Appl. No.: 341,565

Related U.S. Application Data

[62] Division of Ser. No. 225,829, Feb. 14, 1972, Pat. No. 3,778,784.

[52] U.S. Cl. 307/279, 307/246, 307/293, 307/305
[51] Int. Cl. H03k 17/00
[58] Field of Search 307/279, 246, 293, 290, 307/305

[56] References Cited
UNITED STATES PATENTS

| | | | |
|---|---|---|---|
| 3,618,053 | 11/1971 | Hudson | 307/279 |
| 3,719,835 | 3/1973 | Eberhard | 307/279 |
| 3,735,154 | 5/1973 | Meeker et al. | 307/279 |

*Primary Examiner*—Rudolph V. Rolinec
*Assistant Examiner*—B. P. Davis
*Attorney, Agent, or Firm*—Spensley, Horn & Lubitz

[57] ABSTRACT

A memory system is disclosed wherein the system may be controlled by providing a single clock signal to an array of memory cells on a monolithic semiconductor substrate. The substrate includes a timing generator means and compensating means which compensates for fabrication variances.

5 Claims, 7 Drawing Figures

MEMORY SYSTEM INCORPORATING A MEMORY CELL AND TIMING MEANS ON A SINGLE SEMICONDUCTOR SUBSTRATE

This is a division, of application Ser. No. 225,829, filed Feb. 14, 1972, now U.S. Pat. No. 3,778,784.

BACKGROUND OF THE INVENTION

It has been recognized in the semiconductor industry that, in many applications such as integrated circuit memories, it is important, from a cost-performance standpoint, that the high component densities be achieved. The reason that high component densities are imortant is readily apparent when it is appreciated that all of the components on an integrated circuit are simultaneously chemically formed and the yield, as to a particular integrated circuit product, is only slightly, if at all, affected by the density of components formed in a monolithic semiconductor substrate.

In connection with integrated circuit memory products and random access memories in particular, the information to be stored is stored in what is referred to as a cell. These cells, in integrated circuits, are commonly formed by a number of MOS devices having a number of interconnect buses to each cell and a number of connections thereto. It should be understood that the term "MOS-device" is employed herein in a generic sense to refer to any device, regardless of the particular technology employed to form that device, that is metal gate, silicon gate, silicon nitride, alumina, etc., wherein at least, a gate and a channel with interconnects to at least two points on said channel are employed. There has been a considerable effort to minimize the number of MOS devices employed in a given cell and to also minimize the number of buses and connections to a cell. The result of minimizing such factors is to increase the density of cells that may be formed in a single integrated circuit monolithic semiconductor substrate. Thus, in U.S. Pat. No. 3,585,613, several memory cells are described. An attempt to further minimize such cell geometry and increase density was described in a paper entitled "Three Transistor Cell 1,024-Bit 500-ns MOS RAM," published in the IEEE Journal of Solid State Circuits, Vol. SC-5, No. 5, October, 1970, by the inventors of the subject patent application. A further step in minimizing cell geometry and the number of interconnect bars and connections to a cell is disclosed in U.S. Pat. Application Ser. No. 180,987, filed Sept. 16, 1971, by Leslie L. Vadasz and Joel L. Karp, now U.S. Pat. No. 3,706,079 and assigned to the assignee of the subject patent application. The memory cell described in this patent is the preferred memory cell to be employed in the memory system described hereinafter, but other cells may be employed.

In memory cells, such as those described in the above-mentioned patent and in the above-mentioned paper, there are employed a plurality of external timing signals to control and operate each memory cell. For example, there has been employed clock signals referred to as "X-enable," "Y-enable" and "pre-charge." All of these clock signals and others are supplied from a source outside of the monolithic substrate, and each of these signals must be precisely timed and configured with respect to one another. Typical specifications regarding the time pulses supplied to an integrated circuit memory cell are provided by the integrated circuit manufacturer and are typified by such published specifications as that issued by Intel Corporation, entitled "MOS LSI Memory 1,103-Fully Decoded Random Access 1,024-Bit Dynamic Memory." The providing of a plurality of timing signals for a single monolithic substrate with singular defined parameters may present no significant problem. However, the providing of a plurality of timing signals to an integrated memory circuit wherein each monolithic substrate varies in its specific parameters within defined toleranaces poses a significant technical problem. As the tolerances of acceptability on a specification for a particular integrated circuit memory device are broadened, then the specification on the timing signals to be supplied for such monolithic substrate becomes extremely difficult, if not impossible, to realize. Conversely, as the specification on an integrated memory circuit device is specified as to very, very narrow limits, the production of useful devices becomes an uneconomical situation. This entire problem is further compounded by increasing the number of devices within a defined monolithic substrate area and by increasing the monolithic substrate area. Such increases in size and complexity further increase the time variances attendant to providing a clock pulse to each cell at the appropriate time. The problem is further complicated in that it is the customer and user of the integrated circuit memory that must supply these timing signals and, thus, the customer has additional restraints placed on the design of the overall system employing such integrated memory circuits. These externally supplied clock signals have tolerances associated therewith. These tolerances tend to limit the performance (e.g., speed) of the memory system.

The above problems, with the prior art devices, become more apparent by a review of the prior art which, in addition to the above-mentioned patent and article, includes U.S. Pat. No. 3,355,721, issued to J. R. Burns on Nov. 28, 1967; U.S. Pat. No. 3,493,786, issued to R. W. Ahrons, et al., on Feb. 3, 1970; U.S. Pat. No. 3,514,765, issued to A. O. Christensen on May 26, 1970; U.S. Pat. No. 3,585,613, issued to Thomas L. Palfi on June 15, 1971; U.S. Pat. No. 3,576,571, issued to Robert K. Booher on Apr. 27, 1971; U.S. Pat. No. 3,387,286, issued to R. H. Dennard on June 4, 1968; U.S. Pat. No. 3,364,362, issued to R. N. Mellott on Jan. 16, 1968; U.S. Pat. No. 3,518,635, issued to R. H. Cole, et al., on June 30, 1970; "Getting More Speed from MOS," Electronics, Feb. 17, 1969; "MOS Random Access Memories," by Burton R. Tunzi, Electronics, Jan. 20, 1969, and "Silicon Gate Dynamics MOS Crams 1,024-Bits on a Chip," Electronics, Aug. 3, 1970, pp. 68–73, by Marcian Hoff.

BRIEF DESCRIPTION OF INVENTION

The subject invention solves a number of the prior art problems, by incorporating a timing generator means integral with the memory cell array on a single monolithic semiconductor substrate. The timing generator means receives a single external signal which results in its generating a plurality of timing signals. In the preferred form of the invention, only a single timing signal is supplied to the semiconductor substrate containing the memory cell array. Thus, the user of the semiconductor memory cell array means no longer is required to provide a plurality of specified timing signals in order to operate the memory.

In addition to the timing generator means, a timing cell means is incorporated on the monolithic semiconductor substrate and this timing cell compensates the generated timing signals to account for the variations in memory cell operation. Further, additional time-compensating circuit means are included in other of the circuit functions so that the operation of these critically timed signals are adapted for variations, such as temperature and processing variables incident to the formation of the monolilthic semiconductor memory. The result of incorporating these timing devices on the same monolithic substrate as the memory cell array is that the adjustment of the timing signals necessary to compensate for such variations is accomlished automatically without the imposition of restrictions on the system designer employing the memory array.

The time required for a charge to be removed from a capacitance means is used to compensate timing signals. The capacitance means which is parasitic capacitance in the presently preferred embodiment is discharged through an MOS device fabricated with the memory. Hence, the rate of discharge of the capacitance is a function of the threshold level of the discharging MOS device and the other MOS devices in that memory since the entire memory is fabricated on a single chip.

BRIEF DESCRIPTOIN OF FIGURES

A specific embodiment of the invention is described below with reference to the figures, wherein.

Figure 3A:
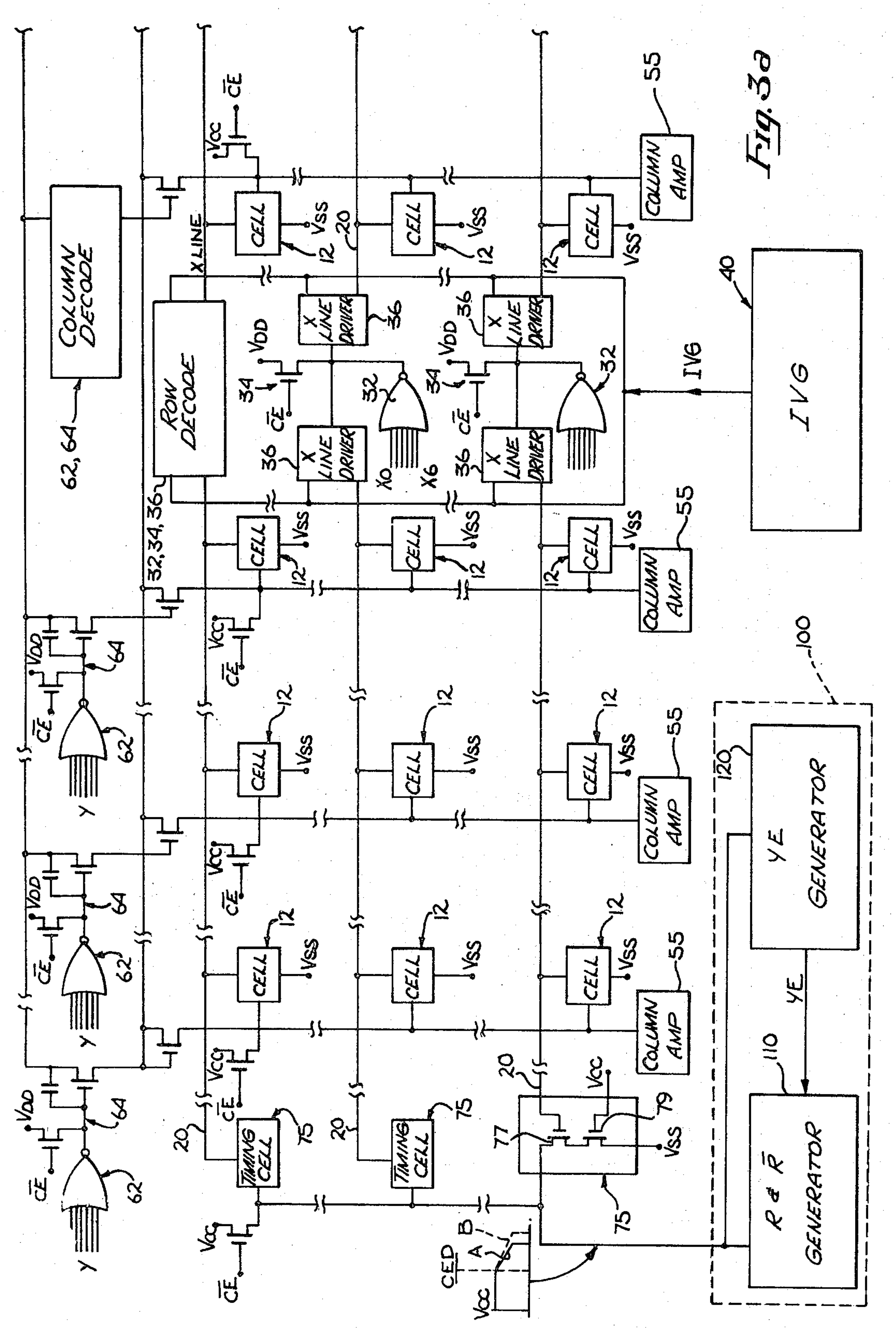
Figure 3B:
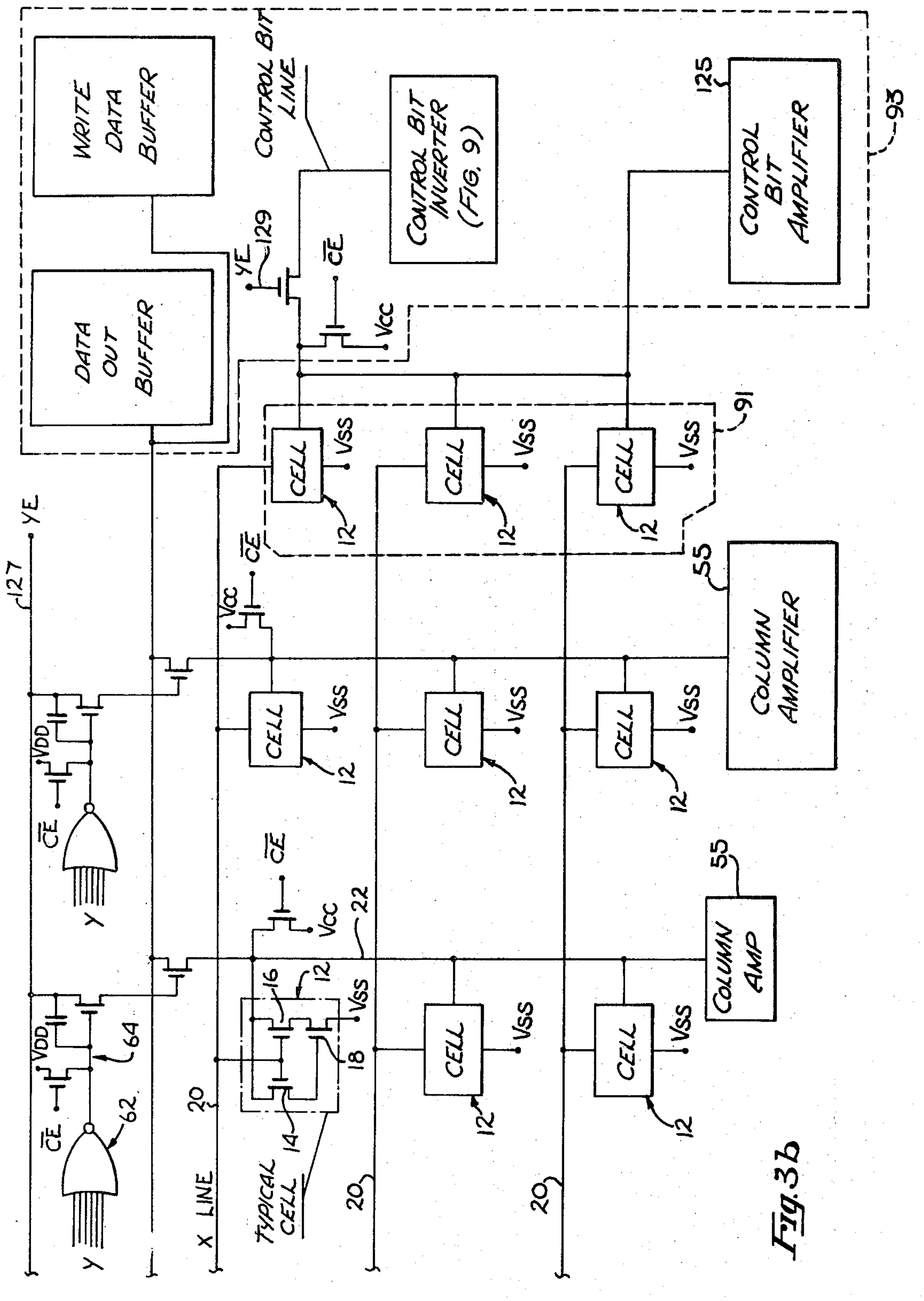
Figure 4:
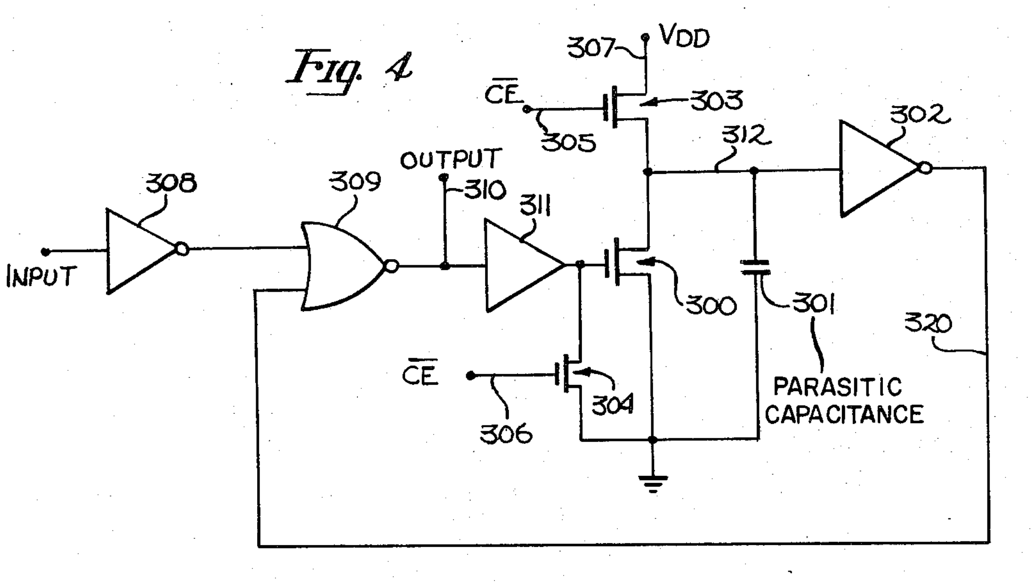
Figure 5:
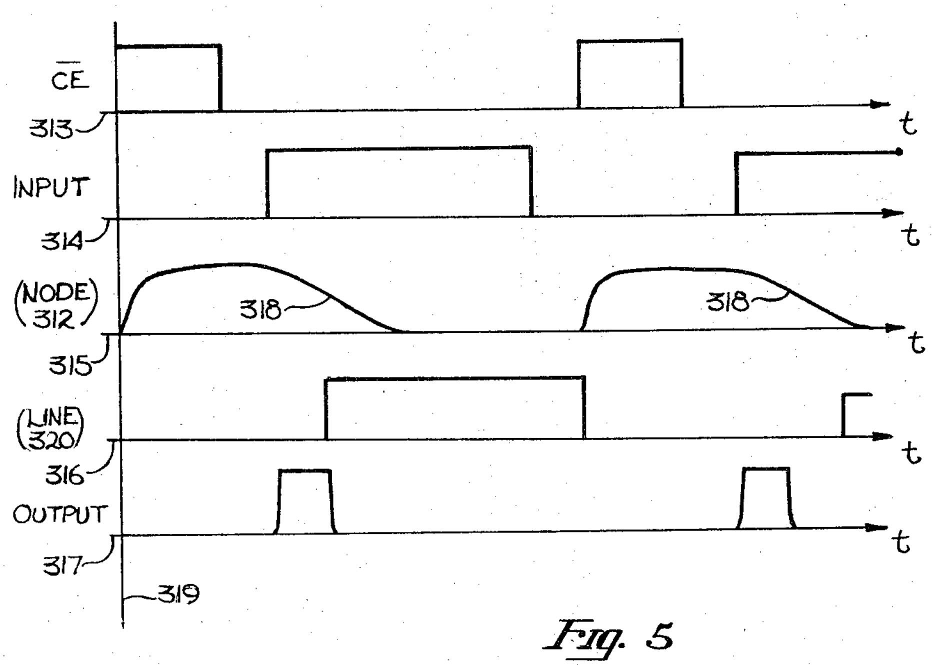

FIGS. 3*a* and 3*b* are detail system diagrams of the memory system;

FIG. 4 is a detail circuit diagram of one embodiment of the timing compensating means;

FIG. 5 is a timing diagram for the operation of the timing compensating means shown in FIG. 4.

DETAILED DESCRIPTION OF EMBODIMENT OF INVENTION

Figure 1:
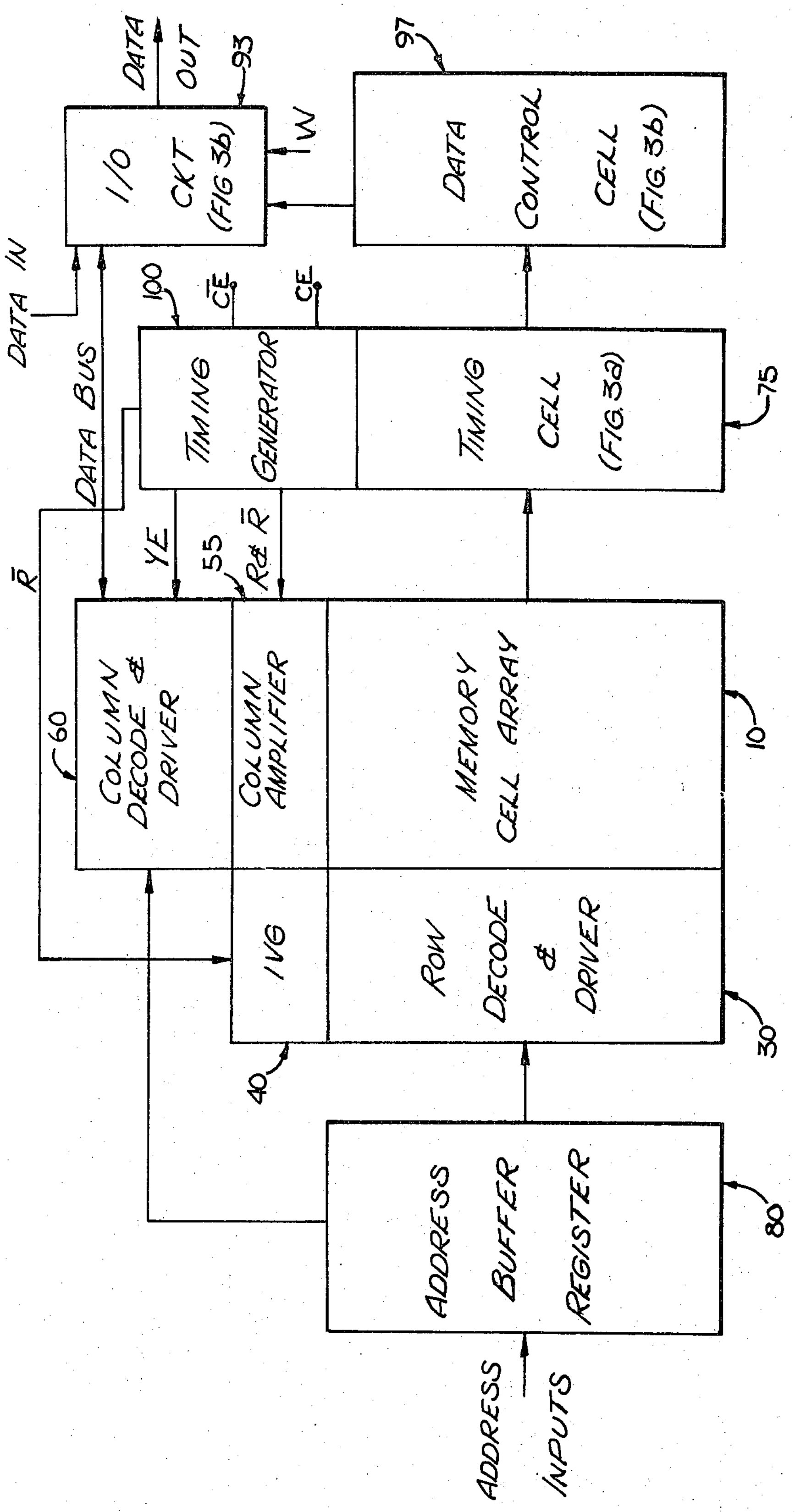
FIG. 1 is a generalized system diagram.

Referring to FIG. 1, there is shown a memory cell array 10 which, in the preferred embodiment, comprises a monolithic semiconductor substrate, including a plurality of memory cells wherein each cell is cabable of storing a bit of information. The memory cell, as well as all of the other circuits described herein, is in the preferred embodiment formed by MOS technology, such as that described in U.S. Pending Patent application Ser. No. 190,987, invented by Leslie Vadasz, and assigned to the Assignee of this Application; now U.S. Pat. No. 3,706,079 U.S. Patent Application Ser. No. 292,510 filed Sept. 27, 1972, invented by Gordon Moore, and assigned to the Assignee of this Application, and other publications relating to MOS silicon gate technology. In addition to employing silicon gate MOS technology, it is preferred that the MOS devices be of an N-type channel construction. It is also preferred that the memory cell array be of the dynamic type, that is, the type wherein storage is dependent upon the charging of the parasitic capacitance associated with the silicon gate devices, and wherein the device discharges periodically and requires a refresh cycle. It is within the scope of the invention to employ other types of MOS devices and other types of cell operation.

The memory cell array 10 comprises a plurality of memory cells which may be a few cells, but typically may range in excess of 1,024 cells and, in the preferred embodiment is 4,096 cells arranged in a 64×64 array. The specific cell arrangement may include any number of transistors and interconnections; however, the preferred cell construction is as shown in U.S. Pat. Application Ser. No. 180,987, invented by Leslie Vadasz and Joel A. Karp, and assigned to the Assignee of the present Application now U.S. Pat. No. 3,706,079. A typical cell construction 12 is shown in FIG. 3*b*, and includes three MOS devices 14, 16 and 18, interconnected as shown. The cell 12 is coupled to a single X or row line 20 which functions as a select line and a single column, or Y-line 22, which enables the transfer of information into and out of a cell during reading and writing.

For purposes of completeness, the operation of the cell 12 will be briefly discussed. To read information from the cell 12 (FIG. 3*b*), the terminal Vss is grounded while the column line 22 is precharged positively. A positive voltage is applied to the X-line 20. The magnitude of this voltage should not be large enough to cause device 14 to freely conduct, but rather only large enough to cause device 14 to partly conduct. If a charge has previously been stored on the parasitic capacitance associated with the gate of device 18, the drain of device 14 and the associated leads, device 18 will conduct. Since the positive voltage applied to the X-line is also applied to the gate of device 16, the device 16 will also conduct, causing the column line 22 to approach ground potential since a current path exists through devices 16 and 18 to ground. If no charge has been previously stored on the parasitic capacitance, device 18 will not conduct and the charge placed on the column line 22 will remain thereon.

Figure 2A:
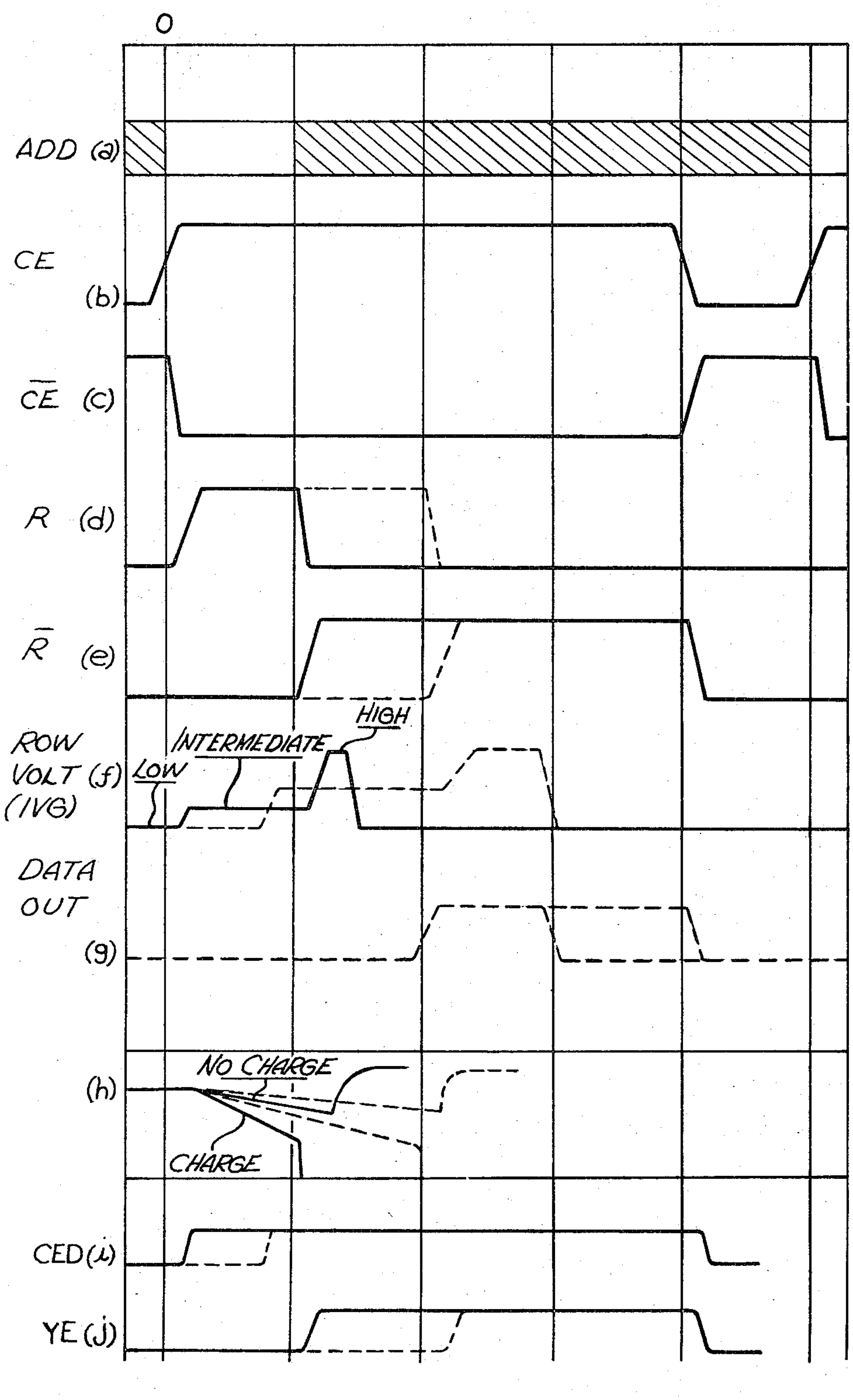
FIG. 2A is a timing diagram for the read cycle of operation of the memory system.

Note, that during the read cycle, when a change previously has been stored on the parasitic capacitance, an undesirable current path exists from the capacitance to ground through devices 14, 16 and 18. If the read cycle is prolonged, or if device 14 is allowed to conduct too freely, the charge stored on the parasitic capacitance will be lost through the terminal Vss connected to ground. If this occurs, device 18 will be turned off, possibly before the charge is removed from the column line 22, thereby giving a false reading. In order to prevent this from happening, the voltage applied to the X-line 20 must be sufficiently controlled to only cause device 14 to partly conduct. This is accomplished by employing an intermediate voltage generator 40 (FIG. 3*a*). The intermediate voltage generator provides a signal such as shown in FIG. 2A-(*f*), which is a tristate or three-level signal having low, intermediate and high voltage levels. It is the intermediate voltage level that is the carfully controlled voltage referred to which enables device 14 to only partly conduct.

In connection with the cell, it should be noted that the intermediate level voltage is also applied to the gate of device 16. Since the source of device 16 is grounded for the described situation, device 16 will more readily conduct than device 18, even though the same voltage is applied to the gates of both devices. Thus, it is possible to read information from the cell, even though a portion of the charge on the parasitic capacitance is being lost during the read cycle. It should be understood that, in certain memory systems, it may be desirable to employ a compliment tecnique for information transfer. In such a situation, the charge in the cell is complimented, that is charge is converted into no charge, and no charge is converted into charge. In such a situation, depending on how the read cycle is defined, the remaining charge may be removed as soon as it is determined that a charge existed in the cell.

To write or store information in the cell, the information to be stored is placed on the column line 22 in the form of a positive voltage. Additionally, during the write cycle, a positive voltage of sufficient magnitude to cause device 14 to fully conduct is applied to the X-line 20. This voltage is shown as the high voltage in FIG. 2A-(*f*). During the write cycle, the terminal Vss is ground. When this occurs, current will flow through device 14 and positively charge the parasitic capacitance.

It should be understood that the above description of the cell operation is simplified for the purpose of explanation herein. In addition, the polarity of the voltages is of no critical consequence as voltages with opposite polarity may be employed for P-type devices.

Referring to FIG. 1, the X-lines 20, previously referred to, are, in general, part of the row decode and drivers 30, which form part of a decode means for generating a signal to select the addressed portion of the memory cell array 10. In addition to the row decode and driver 30, column decode and driver 60 form part of the decode means. Numerous forms of decode and drivers are well-known in the prior art. The column decode 60 is shown in FIG. 3*a* as comprising the nor gates 62 with the associated circuitry 64. The detailed operation of this circuit is not of specific importance to the invention, and may be understood by one of ordinary skill in the art from the circuit diagram. Similarly, the row decode comprises nor gates 32, and associated circuitry 34, which are, in turn, coupled to X-line drivers 36, coupled to drive X-lines 20 (FIG. 3*a*).

Referring to FIG. 1, the X and Y inputs to row decode and driver 30 and column decode and driver 60 are supplied by address buffer register means 80, which is coupled thereto. Address buffer registers are well-known in the art. Thus, it can be seen address inputs are supplied to address buffer register 80 which, in turn, supplies input signals to row decode 30 and column decode 60, which, in turn, enable the desired memory cell to be accessed. It should be noted that the row decode 30 and column decode 60, along with the address buffer 80, are, in the preferred form of the invention, formed on a single monolithic substrate, which substrate also includes memory cell array 10.

The operation of the memory system and, in particular, the memory cell array 10, column decode 60, row decode 30, intermediate voltage generator 40 and address buffer register 80 are controlled by timing generator 100. The timing generator 100 receives input signals designated CE and $\overline{CE}$, and a signal from timing cell 75. The signal CE, which may be refered to as the chip enable signal, is a single clock signal, provided from an external source. This is the only clock signal provided to the monolithic semiconductor substrate. The general form of the CE signal is shown in FIG. 2A-(*b*), both its leading and trailing edges are important in controlling the operation of the memory system. It is, of course, within the scope of the invention to employ additional circuits so that only one edge of the signal CE is important. The signal $\overline{CE}$ supplied to timing generator means, is an inverted CE signal and is formed by a $\overline{CE}$ driver. The details of the $\overline{CE}$ driver circuit are, for the purposes of this invention, not important, but it is only important that an inverted $\overline{CE}$ signal be provided.

The timing generator 100 supplies the output signals R, $\overline{R}$, and YE. The general configuration of the signals R and $\overline{R}$ is shown in FIGS. 2A-(*d*) and 2A-(*e*). The R and $\overline{R}$ signals are provided by R and $\overline{R}$ generator 110 (FIG. 3*a*) and forms part of the timing generator 100. The R and $\overline{R}$ generator 110 is supplied with the inputs YE (Y-enable), CE, $\overline{CE}$ and W, all of these being signals generated on the monolithic semiconductor substrate, with the exception of the CE signal. The YE signal is supplied by the YE generator 120, shown generally in FIG. 3*a*. The YE generator 120 which forms part of the timing generator means 100 employs only the CE signal and the $\overline{CE}$ signal as input along with the inputs from the voltage sources. One of the outputs of the YE generator 120 is supplied to the R and $\overline{R}$ generator 110. The signal W is supplied by a W generator the structure of which is not important for a understanding of the present invention.

Figure 2B:
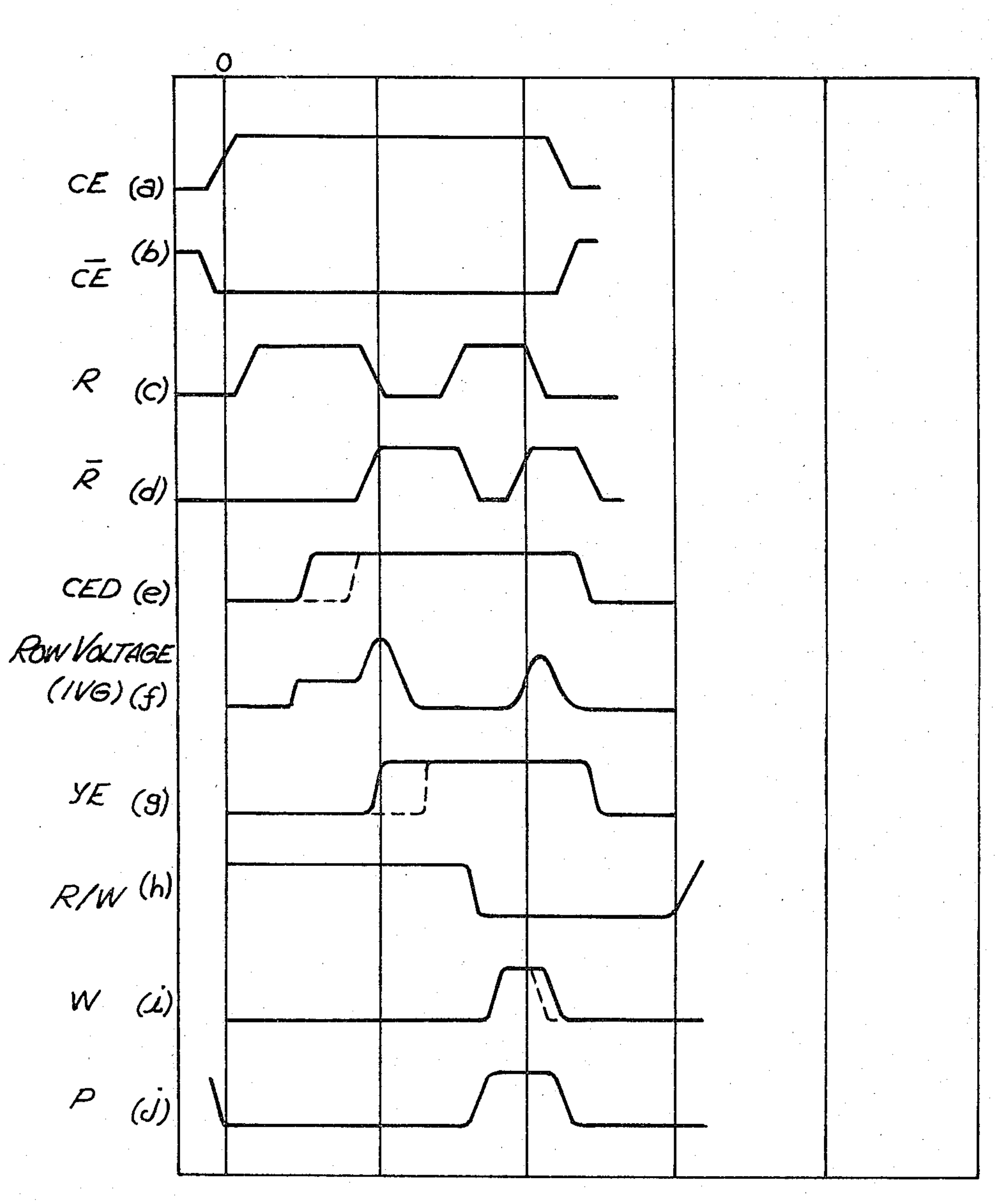
FIG. 2B is a timing diagram for the read modify write cycle of the memory system operation.

In general, the R and $\overline{R}$ signals are supplied to the column amplifier 55 to control the reading of the selected cell. The R signal facilitates the control bit amplifier 125 moving to a low level when there is a charge in the selected cell. The $\overline{R}$ signal is also supplied to the IVG generator 40 and enables the row voltage to move from the intermediate voltage to a high voltage (FIG. 2A). These signals are, of course, used in other of the functional circuits to facilitate the logical functioning and timing of the overall memory system. The output of the YE generator 120 is, in general, employed in connection with the functional circuits associated with the Y-column lines 22, such as the control bit amplifier 125 (FIG. 3*b*), the column decode line at 127 (FIG. 3*b*) and the control bit line at 129 (FIG. 3*b*). Thus, it can be seen that the timing generator comprises R and $\overline{R}$ generator 110, and YE generator 120, (along with other associated signal generators) provide timing signals R, $\overline{R}$ and YE which are the timing signals generated on the monolilthic semiconductor substrate from the single clock signal CE and its inverted form $\overline{CE}$. There are, of course, other signals generated on the substrate that contribute to the overall timing and operation of the memory system as can be seen from FIGS. 2A and 2B. The signals in effect, during any particular cycle will be different as can be seen from a comparison of FIGS. 2A and 2B. FIG. 2A shows those signals that are particularly important during the read cycle while FIG. 2B shows those signals that are particularly important during the read-modify-write cycle. It should be noted that the signal W (from the W generator), and the signal R/W (an external information or logic signal as distinguished from an external timing signal) are added to this cycle. The presence of R/W signal enables the generation of the additional R and $\overline{R}$ signals, and W and IVG signals necessary for the modify-write.

As shown in FIG. 2*b*, the R signal, is a sample pulse which commences the internal read cycle with the internal read cycle being complete at approximately the time of the negative going edge of the pulse R and the positive going edge of pulse $\overline{R}$, at which time the external read commences. The R signal negative going edge moves the column amplifier I/O column line to a low level point at the occurrence of the negative going edge, if the charge is at a certain level at such time in the cell. The $\overline{R}$ signal moves that I/O column line to a high level if the charge in the cell is a predetermined level when $\overline{R}$ becomes positive (up). The internal read is approximately that period from the commencement of the intermediate level voltage of the IVG signal to the time that positive going edge of the $\overline{R}$ signal occurs. The external read is approximately that period during which the $\overline{R}$ signal is positive. It is important to note in FIG. 2A-(*d*) that the R signal is shown in solid and also in dashed lines. The dashed lines indicate that the R signal has a pulse width (e.g., trailing edge) that may vary from monolithic substrate to substrate or within a substrate. Thus, means are employed on the monolithic substrate for varying the pulse width of this signal. Similarly, the timing signal $\overline{R}$ (and IVG, YE, W, etc.) will have a variable pulse width. The variable IVG voltage, provided by the intermediate voltage generator, will have a variable configuration as shown in FIG. 2A-(*f*) by the dashed lines. These pulses and signals are adjusted (as well as other signals) for the variance in device processing and temperature and other variables by timing cell 75 (FIG. 1 and 3*a*) which is shown in detail in FIG. 3*a*. In addition to the timing cell, time-compensating means are employed in a number of the circuits, such as the row decode means 32, 34 and 36, the CED driver, and others to compensate for process variables and/or to minimize power dissipation. The time compensating means is shown in FIG. 4 and is described in detail later in the sepcifications.

Returning to the timing cell as shown in FIG. 3*a*, a timing cell is associated with each row of cells and is coupled to the X-line 20. It is, of course, within the scope of the invention to employ less than or more than a single timing cell with each X-line 20. For example, it may be possible to employ a single timing cell shared by all of the X-lines 20. One of the general purposes of timing cell 75 is to adjust the R, $\overline{R}$, and YE signal to compensate for variances in the memory cell characteristics (e.g., charge and discharge profile) which occurs from substrate to substrate and within the substrate. It should be understood that as the characteristic of a memory cell varies, the discharge of the parasitic capacitance therein will also vary from memory cell to cell and from substrate (e.g., memory system) to substrate (e.g., memory system). Since the reading of a zero or one bit depends upon the discrimination between two levels of voltage which vary with the discharge characteristics and since this discharge characteristic varies as a function time and from substrate to substrate (and slightly from area to area within that substrate), it can be seen that it is critically important that the R and $\overline{R}$ signals be specifically tailored and timed to the particular characteristic of the memory cell existing on the monolithic semiconductor substrate. It is highly desirable to attain such timing signal adjustability automatically, without regard to any external adjustments of external clocks. It is this automatic adjustment that is provided by the timing cell 75 which, in substance, functions as an adaptive element compensating the timing signals for the particular cell construction and environment automatically. It should be understood that the characteristic of the memory cells vary for numerous reasons, but one of the most significant factors causing such variations is the variation of the process for forming the cell which varies from time to time.

More specifically referring to FIG. 3*a*, the timing cell 75 comprises MOS devices 77 and 79. The device 77 has one of its terminals coupled to the R, $\overline{R}$ and YE generator 110 and the $\overline{YE}$ generator 120, and the other of its terminals is coupled to a terminal of the MOS device 79. The MOS device 79 has another of its terminals coupled to the voltage source Vss with its gate coupled to the source Vcc. The gate associaed with the device 77 is connected to the X or row line 20. The devices 77 and 79, in part, simulate the memory cells 12 with the devices 77 and 79 being counterparts to the devices 16 and 18, respectively. The device 14 of the memory cell, which is primarily employed for writing, is omitted from the timing cell since a writing function is not required in the timing cell. The timing cell is located at one end of a row of cells, in order that it may compensate and take into account propagation delays along the bus line connecting the cells, as well as the process variations, temperature variations and other variables incident to the forming of the monolithic semiconductor substrate and the devices therein.

The timing cell 75 provides a variable output signal, wherein the output signal has a variable slope depending upon the characteristics of the cell which simulates the characteristics of the memory cells. More specifically, the signal provided by the timing cell 75 is shown in schematic form adjacent to the input/output line 81 which is connected to the timing cells. This schematic shows the input/output line 2 being charged to a positive voltage Vcc and at time CED, that is at the time the signal CED goes positive. When CED goes positive the read cycle commences and the line 2 is discharged with a slope or rate of discharge as shown in the region A of the signal schematic (FIG. 3*a*). The discharge of line 2 is dependent upon the characteristics of the timing cell 75. As the characteristics of the timing cell vary from substrate to substrate, or within the substrate, the discharge curve will be altered as typically shown at B. This variable discharge signal is supplied to the timing generator means 100 and specifically the R and $\overline{R}$ generator and YE generator 120 to determine the pulse width of the signals R, $\overline{R}$ and YE as shown in FIG. 2A(*d*) and 2A(*c*). These signals R and $\overline{R}$ are, in turn, employed in the column amplifier 55 and the intermediate voltage generator 40 to participate in the control of the read and write functions.

From the above, it can be seen that the timing cells automatically adjust timing signals to compensate for memory cell variations and to enable precisely timed adaptive signals to be provided for controlling memory system operation. The incorporation of the timing cell on the same substrate memory cell array means contributes to the practicality of incorporating the timing generator on the same substrate. Thus, the present invention makes it possible to incorporate the cell array, timing generator, decode means, buffer registers on a single substrate. Further, the precision timing achieved enables an IVG signal to be employed which facilitates the use of a cell of minimum geometry, interconnects and connecting.

In addition to the timing cell, a timing compensating circuit means is employed in various circuits of the memory system to provide pulse widths and delays adaptive to process variables, temperature and other variables incident to the forming of the monolithic semiconductor substrate and the devices therein. In addition, the time compensating means is employed to minimize power dissipation. One form of this time compensating means is shown in the circuit diagram of FIG. 4 and the accompanying diagram shown in FIG. 5.

Referring to FIG. 4, a circuit is illustrated which may be used for generating internal clock pulses such as those which may be utilized for the write timing pulses and IVG. The circuit includes a monostable circuit; the period of instability of this circuit determines the pulse width of output timing signals. This period is primarily a function of a parasitic capacitor and the conductance of an MOS device. As will be seen, the circuit provides inherent compensation for fabrication differences between substrates.

The input control signal to the circuit is applied to inverter 308; the output of inverter 308 being coupled to one input terminal of the NOR gate 309. The other input terminal to NOR gate 309 is coupled to the output of an inverter 302 by lead 320. The output from NOR gate 309 is coupled to buffer 311; this lead is also coupled to the output terminal 310. The output from buffer 311 is coupled to one terminal of the MOS device 304 and to the gate of the MOS device 300. The other terminal of device 304 and one terminal of device 300 are coupled to ground. The other terminal of device 300 is coupled to one terminal of MOS device 303 and to the input of inverter 302. The other terminal of device 303 is coupled by lead 307 to a source of potential $V_{DD}$. The gates 305 and 306 are coupled to terminals designated as $\overline{CE}$. A capacitor 301 is coupled between ground and node 312; this capacitance in the presently preferred embodiment is the parasitic capacitance between the node 312 and the substrate upon which the circuit of FIG. 4 is fabricated. The circuit of FIG. 5 may be fabricated utilizing MOS technology on said single substrate or chip. In the presently preferred embodiment the MOS devices 300, 303 and 304 are field effect transistors which utilize polycrystalline silicon gates. The inverters 302 and 308, the NOR gate 309 and the buffer amplifier 311 comprise well known logic and buffer circuitry.

The operation of the circuit of FIG. 4 may be most readily understood in conjunction with the graph of FIG. 5. In the graph of FIG. 5 the line 313 designates the input to gates 305, and 306, $\overline{CE}$. The line 314 indicates the input signal to inverter 308 which may be an internally generated timing signal or an externally applied timing signal. The waveform shown on line 315 indicates the waveform which would appear at node 312, and the waveform shown on line 316 is the waveform which would appear on lead 320. The output waveform which would appear on lead 310 is shown on line 317 of FIG. 5.

Assume for the purposes of explanation that at time 0 (indicated by line 319 of FIG. 5) the signal designated as $\overline{CE}$ is applied to the gates of devices 303 and 304. When this occurs device 303 will conduct and capacitor 301 is charged to a voltage of approximately $V_{DD}$. Note that since device 304 is conducting the gate of device 300 is at ground potential and hence no conductive path exists from node 312 to ground through that device. Thus, the charge on capacitor 301 will have no readily conductive path to discharge at this time. The rise in potential at node 312 after time 0 is indicated on line 315 of FIG. 5.

During the time that node 312 is at a potential which approaches $V_{DD}$ the outpt from inverter 302 will be "low" since the input to the inverter is "high" as indicated on line 316. Also following time 0 since no input signal is applied to the input of inverter 308 its output is "high," thus there will be no output signal from the NOR gate 309 as indicated on line 317 of FIG. 5. When an input signal is applied to the input of inverter 308 as indicated on line 314, the logic to NOR gate 309 is met and an output signal will occur on lead 310 as indicated on line 317 and, additionally, this output signal will cause device 300 to conduct since the signal is coupled to the gate of this device thorugh buffer 311. As device 300 conducts capacitor 301 is discharged through device 300 and the potential at node 312, as shown on line 315 of FIG. 5, approaches ground potental. At a point in time indicated with the numeral 318, the potential applied to inverter 302 will drop sufficiently to cause an output signal on lead 320, as indicated on line 316. Thus, with the embodiment illustrated in FIG. 4, inverter 320 operates basically as a Schmidt trigger and, hence, anyone of numerous Schmidt trigger circuits may be utilized in lieu of inverter 302. When a "high" signal appears on lead 320 the input logic to NOR gate 309 is no longer satisfied and, hence, the output signal on lead 310 drops to its "low" state. It should be noted that the pulse width of the signals shown line 317 is a direct function of the rate at which capacitor 301 discharges through device 300.

Since the rate at which capacitor 301 discharges through device 300 is a function of the conductance of that device, the pulse width of the output signal can be determined by or made a function of the geometry of device 300 in addition to other parameters such as the capacitance of parasitic capacitor 301. In the presently preferred embodiment, the pulse width is varied by varying the ratio of $z/1$ where $z$ and 1 are the width and length, respectively, of the channel associated with device 300. For example, if the ratio $z/1$ is made larger by either making the channel width greater and/or the length shorter, capacitor 301 will discharge more quickly and a narrower output pulse on lead 310 will result. Similarly, if the ratio $z/1$ is decreased by making a narrower channel and/or a longer channel, capacitor 301 will discharge more slowly and, hence, the pulse width of the output pulse will be increased. Thus, the desired pulse width may be designed into the circuit.

In fabricating field effect devices utilizing MOS technology, variations often exist from chip to chip in the threshold values of the devices on a given chip. However, the devices on any given chip generally vary from the norm in the same direction and by approximtely the same amount. Because of these variations from chip to chip it becomes in some instances difficult to utilize timing pulses having a constant pulse width. For example, a given pulse width applied to a chip where the threshold voltages are generally lower (and the circuits faster) will achieve a different result than on a chip where the threshold voltages are generally higher and where the devices are somewhat slower responding.

Assume that the circuit of FIG. 4 is fabricated on an MOS chip where the threshold levels of the circuitry on that chip are generally lower. This will mean that device 300 will also have a lower threshold and, hence, will discharge more quickly resulting in a narrower pulse width on the output lead 310. It should be noted that since the remaining circuitry on the chip is somewhat faster, due to the lower thresholds a shorter pulse width is desirable. On the other hand, if the circuit of FIG. 4 is fabricated on a chip where the thresholds are somewhat higher than the norm, device 300 will also have a higher threshold, and hence, capacitor 301 will discharge more slowly. This will result in wider output pulse (lead 310) that will compensate for the slower circuits on that chip. Thus, by using the timing circuit shown in FIG. 5, an automatic compensation is achieved for variations from chip to chip. It has also been found that the circuit compensates for masking variations from chip to chip.

With the basic system described above, the general operation of the system will now be described with reference to FIG. 1, 3*a*, 3*b* and 2A. The operation of the system will be described for a typical read cycle with the primary signals those shown in the FIG. 2A. To commence the read cycle, a CE signal is received from an external clock source as shown in FIG. 2A(*b*).

The CE signal results in the generation of the $\overline{CE}$ signal, which is also supplied to timing generator 100, and is shown in FIG. 2A(*c*). The timing generator 100 supplies the output signal YE to the column decode and driver 60 to enable the address supplied to the address buffer register 80 (at approximtely the same time that the CE signal is supplied to the timing generator 100) to be decoded. The address buffer register 80 is decoded by the column decode 60 and row decode 30, which decoding, in turn, selects a particular cell from memory cell array means 10. The decode period extends approximately from the time of the positive going edge of the CE signal to the time at which the output signal of the intermediate voltage generator 40 moves from a low level to an intermediate level. This change in voltage by the intermediate voltage generator 40 occurs at approximately the time of the positive going edge of the signal CED which signal is supplied by the CED driver. The timing of the CED signal is determined by the signals CE and $\overline{CE}$, along with the time compensating circuit (FIG. 4) contained in CED, which enables the CED signal to vary in accordance with the solid and dashed lines shown in FIG. 2A(*i*). This variance of the CED signal, in turn, causes the output voltage from the intermediate voltage generator to vary the time at which such output voltage moves from a low to an intermediate level, as shown in FIG. 2A(*f*). Thus, the decode period will vary accordingly.

Once the decode is completed and the intermediate voltage is supplied by the intermediate voltage generator 40 to the selected memory cell, then the internal read cycle commences and the selected memory cell 12 is read as previously described in the detailed description relating to the memory cells. The internal read cycle is completed approximately at the time of the positive going edge of the $\overline{R}$ bar signal (and the negative going edge of the R signal) at which time the external read cycle (and restore) is commenced. It should be noted that the internal read cycle is also a period which is varied in accordance with the solid and dashed lines shown in FIGS. 2A(*d*) (*e*) and (*f*). This variation of the internal read cycle, that is the negative going edge of the R signal and the positive going edge of the $\overline{R}$ signal, is accomplished by the timing cell 75 coupled to the timing generator 100.

The positive going edge of the $\overline{R}$ signal supplied by the time generator 100 to the intermediate voltage generator 40 causes the intermediate voltage generator to move to a high level. It should be recalled that about this time the R and $\overline{R}$ signals supplied to the column amplifier enable the column amplifier 55 to sense the existence of a charge or no charge in the selected memory cell and supply a high or low output signal to the data control cell 97 in cooperation with the control bit amplifier. The control bit amplifier in one form, stores the read information in complement form in data control cell 97, which information is then transferred to the input/output circuits 93. It should be noted that employing the compliment technique facilitates the construction and operation of the column amplifier so that the external read cycle takes place in relatively short periods of time with the intermediate voltage generator operating at a high level for a minimum period of time, thus minimizing the power dissipation. It is within the scope of the invention to employ other than a compliment information transfer technique. It can be seen from FIG. 2A(*h*) that the data output is then supplied to the output terminal. Thus, the information is read out in a typical cycle.

Certain of the timing signals supplied during the read-modify-write cycle are shown in FIG. 2B. It should be noted that a portion of this cycle is substantially identical to the read cycle, since a read operation is first performed and then a write-modify operation takes place. Briefly, in addition to the signals supplied for a read cycle during this cycle, a logic or informational signal R/W is supplied to the W generator to generate the signal W shown in FIG. 2B. The signal W is supplied to the input/output circuit 93 and to the timing generator 100 and specifically to the R and $\overline{R}$ Generator. This signal W enables another cycle of the R and $\overline{R}$ signal to be generated while there is no additional positive going edge of the CED signal generated. It will be recalled that the CED signal initiated the moving of the output voltage of the intermediate voltage generator 40 from a low level to an intermediate level. The absence of the CED signal after the read operation is accomplished and the presence of another R and $\overline{R}$ signal enables the intermediate voltage generator to move from a low level to a high level. It is this high level signal of the intermediate voltage generator, along with the timing signal W generated on the substrate that enables the write modify operation to be accomplished following the read cycle. The other signals supplied, of course, take part in the overall operation of the system, but such details are not specifically important to the present invention and may be understood from the diagrams and description herein by one of ordinary skill in the art.

In summary, it should be appreciated that the entire system and circuitry is included on a single monolithic substrate which received a single external clock signal to operate the system. One typical memory system built in accordance with the present invention was placed on a monolithic substrate approximately 0.140 × 0.170 inches, with substrate contains approximately 15,000 components. An exemplary system built in accordance with this invention had the following estimated characteristics:

4,096 Bits; 4,096 words by 1 Bit
TTL Compatible Inputs (except clock)
Single clock Input (high level)
Cell Size < 2 mil² (3 transistor)
Access time < 300ns
Cycle time < 500 ns
Active power < 100 w/bit
Power supplies: +12V, +5V, −5V
Standby Power 1 w/bit
Standard 22 pin package It is within the scope of the invention to employ the described invention in less complex systems containing bits of information and fewer components and to apply the invention to other forms of memory systems other than the specific and detailed one described hereinabove.

We claim:

1. A timing circuit comprising:

a field effect transistor having at least two terminals and a gate;

capacitance means having one terminal coupled to one terminal of said transistor;

charging means for selectively charging said capacitor means coupled to said capacitor means;

logic circuit means for providing a logic output signal upon predetermined conditions;

Schmitt trigger means having its input coupled to said one terminal of said capacitor and said one terminal of said transistor, and its output coupled to said logic circuit means;

whereby the output of said Schmitt trigger shall be a function of the rate at which said capacitor means discharges.

2. A timing circuit triggered by an input signal comprising:

a field effect transistor having two terminals and a gate;

capacitance means coupled across said two terminals of said transistor;

charging means for charging said capacitance means coupled to said capacitance means;

step function means, for sensing the voltage on said capacitance means and for providing a binary output signal when said voltage reaches a predetermined level;

logic network for combining said input signal and said output signal of said step function means in accordance with predetermined logic, and for providing an output control signal for controlling said gate of said transistor;

whereby an output signal is generated having a pulse width which is a function of the discharge rate of said capacitance means.

3. The circuit defined in claim 2 wherein said capacitance means comprises parasitic capacitance.

4. The circuit defined in claim 3 wherein said step function means comprises an inverter.

5. The circuit defined in claim 4 wherein a buffer means interconnects said logic network and said gate of said transistor.

* * * * *